US012707176B2

(12) United States Patent
Liu et al.

(10) Patent No.: US 12,707,176 B2
(45) Date of Patent: Aug. 11, 2026

(54) SPEAKER ASSEMBLY, MICROPHONE AND SMART PORTABLE KARAOKE SYSTEM

(71) Applicant: JIANGXI TAIDE INTELLIGENCE TECHNOLOGY CO., LTD., Fuzhou (CN)

(72) Inventors: Wei Liu, Fuzhou (CN); Ya Chen, Fuzhou (CN)

(73) Assignee: JIANGXI TAIDE INTELLIGENCE TECHNOLOGY CO., LTD., Fuzhou (CN)

( * ) Notice: Subject to any disclaimer, the term of this patent is extended or adjusted under 35 U.S.C. 154(b) by 168 days.

(21) Appl. No.: 18/603,924

(22) Filed: Mar. 13, 2024

(65) Prior Publication Data

US 2024/0348955 A1 Oct. 17, 2024

(30) Foreign Application Priority Data

Apr. 11, 2023 (CN) ......................... 202310385595.6

(51) Int. Cl.
*H04R 1/02* (2006.01)

(52) U.S. Cl.
CPC ........... *H04R 1/02* (2013.01); *H04R 2201/02* (2013.01)

(58) Field of Classification Search
CPC ........ H04R 1/00; H04R 1/02; H04R 2201/02; H04R 1/08
USPC ............................................. 381/91–92, 122
See application file for complete search history.

(56) References Cited

U.S. PATENT DOCUMENTS

2004/0202346 A1* 10/2004 Park ....................... H04R 1/026 381/387
2006/0277555 A1* 12/2006 Howard .............. B60R 11/0211 720/600
2011/0274307 A1* 11/2011 Lynch ...................... H04R 1/02 381/389

FOREIGN PATENT DOCUMENTS

CN 107277587 A 10/2017
CN 206775665 U 12/2017
CN 217116306 U 8/2022
(Continued)

OTHER PUBLICATIONS

China National Intellectual Property Administration, First Office Action in CN Application No. 202310385595.6, 10 pages including English translation.
(Continued)

*Primary Examiner* — Disler Paul
(74) *Attorney, Agent, or Firm* — Schwabe, Williamson & Wyatt, P.C.

(57) ABSTRACT

The present application relates to the technical field of audio device, and in particular discloses a speaker assembly, a microphone and a smart portable karaoke system. The speaker assembly includes an accommodating groove for storing a microphone. When the microphone is in the accommodating groove, the microphone has two states: a sunken state, in which the microphone is configured to slide downwards with respect to the accommodating groove and is locked in the accommodating groove when being pushed for the first time; and a lifted state, in which the microphone is released and is configured to slide upwards with respect to the accommodating groove when being pushed again. The speaker assembly provided by the present application can effectively solve the problem that the microphone is inconvenient to carry and accommodate.

9 Claims, 5 Drawing Sheets

(56) References Cited

FOREIGN PATENT DOCUMENTS

| | | | | | |
|---|---|---|---|---|---|
| WO | WO2022261935 | | * | 6/2021 | |
| WO | WO-2022261935 | A1 | * | 12/2022 | ............... H04R 1/20 |

OTHER PUBLICATIONS

China National Intellectual Property Administration, Second Office Action in CN Application No. 202310385595.6, mailed Dec. 27, 2024, 14 pages including English translation.

* cited by examiner

SPEAKER ASSEMBLY, MICROPHONE AND SMART PORTABLE KARAOKE SYSTEM

CROSS REFERENCE TO RELATED APPLICATIONS

This application claims the priorities to Chinese patent application No. 202310385595.6, titled "SPEAKER ASSEMBLY, MICROPHONE AND SMART PORTABLE KARAOKE SYSTEM", filed with the China National Intellectual Property Administration on Apr. 11, 2023, the entire disclosure of which is hereby incorporated by reference.

FIELD

The present application relates to the technical field of audio device, and in particular to a speaker assembly, a microphone and a smart portable karaoke system.

BACKGROUND

A karaoke system includes a display screen for selecting songs, a microphone for picking up sounds, and a speaker for playing sounds. The karaoke system is mainly used in an indoor place such as a karaoke box or the like, and the display screen, the microphone and the speaker are usually arranged separately. Specifically, the display screen is fixed on a display screen holder, the microphone is arranged on a microphone holder in a detachable manner or directly on the table, and the speaker is mounted and fixed at a top corner of the room in general.

In recent years, outdoor activities become more and more popular, and outdoor karaoke are becoming favored by customers. However, the separate structure of the display screen, the microphone and the speaker makes the karaoke system inconvenient to carry and accommodate. Some manufacturers fix the display screen onto the speaker to improve the portability of them, while there has not been a good way to accommodate the microphone.

Therefore, the existing karaoke system needs to be improved, to solve the problem that the microphone is inconvenient to carry and accommodate.

The above information disclosed in the Background is included only to enhance understanding of the context of the disclosure, and therefore may contain information that does not form the prior art that is currently known to those skilled in the art.

SUMMARY

An object of the present application is to provide a speaker assembly, a microphone and a smart portable karaoke system, which effectively solve the problem that the microphone is inconvenient to carry and accommodate.

To achieve the above object, in one aspect, a speaker assembly is provided according to the present application. The speaker assembly includes an accommodating groove for accommodating a microphone, and when the microphone is in the accommodating groove, the microphone has two states:

a sunken state, in which the microphone is configured to slide downwards with respect to the accommodating groove and is locked in the accommodating groove when being pushed for the first time; and a lifted state, in which the microphone is released and is configured to slide upwards with respect to the accommodating groove when being pushed again.

In an embodiment, the speaker assembly includes:

a accommodating cylinder, and a claw sleeve, and, the accommodating cylinder is provided with the accommodating groove, and a groove wall of the accommodating groove is provided with an abutting slope;

the claw sleeve is mounted in the accommodating groove and is slidable in upward and downward directions, and the claw sleeve is provided with a claw hook portion at a place corresponding to the abutting slope; where when the claw sleeve is under a downward driving force, the claw hook portion is configured to slide downwards along the abutting slope, and the claw hook portion is configured to contract inwards in a radial direction to lock the microphone; and when the claw sleeve is under an upward driving force, the claw hook portion is configured to slide upwards along the abutting slope, and the claw hook portion is configured to expand outwards in the radial direction to release the microphone.

In an embodiment, a lifting spring is arranged under the claw sleeve, and is configured to drive the claw sleeve to slide upwards with respect to the accommodating groove.

In an embodiment, a lift-limit boss is provided on the groove wall of the accommodating groove, and the lift-limit boss protrudes above the claw sleeve to prevent the claw sleeve from sliding further upwards.

In an embodiment, a bottom portion of the claw sleeve is provided with a hook portion, and a groove bottom of the accommodating groove is fixedly provided with a snap-fit push-push latch for locking the hook portion.

In an embodiment, the accommodating cylinder includes an upper sleeve provided with the lift-limit boss and a lower sleeve in a fixed connection with the snap-fit push-push latch, and the upper sleeve and the lower sleeve are in a snap-fit connection.

In an embodiment, the speaker assembly further includes:

a speaker body, the speaker body is provided with an inner space, the accommodating cylinder is located in the inner space, and an opening of the accommodating groove is exposed;

a display screen, the display screen is in a hinged connection with the speaker body; and the display screen has two states, an accommodating state where the display screen is rotated with respect to the speaker body to a position covering the opening of the accommodating groove, and a use state where the display screen is rotated with respect to the speaker body to a position away from the opening of the accommodating groove.

In an embodiment, a top face of the speaker body is provided with a screen groove, the opening of the accommodating groove is located at a groove bottom of the screen groove, and when the display screen is in the accommodating state, the display screen is in the screen groove.

In another aspect, a microphone is provided according to the present application, and the microphone is inserted into the accommodating groove of the speaker assembly according to any one of the above solutions.

In yet another aspect, a smart portable karaoke system is provided according to the present application, and the smart portable karaoke system includes the speaker assembly and the microphone according to any one of the above solutions.

The beneficial effects of the present application lie in that, a speaker assembly, a microphone and a smart portable karaoke system are provided, such that the microphone can be stored in the speaker body, thereby solving the problem in the prior art that the microphone is inconvenient to carry and accommodate due to separate arrangement.

BRIEF DESCRIPTION OF THE DRAWINGS

For more clearly illustrating the technical solutions in the embodiments of the present application or in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
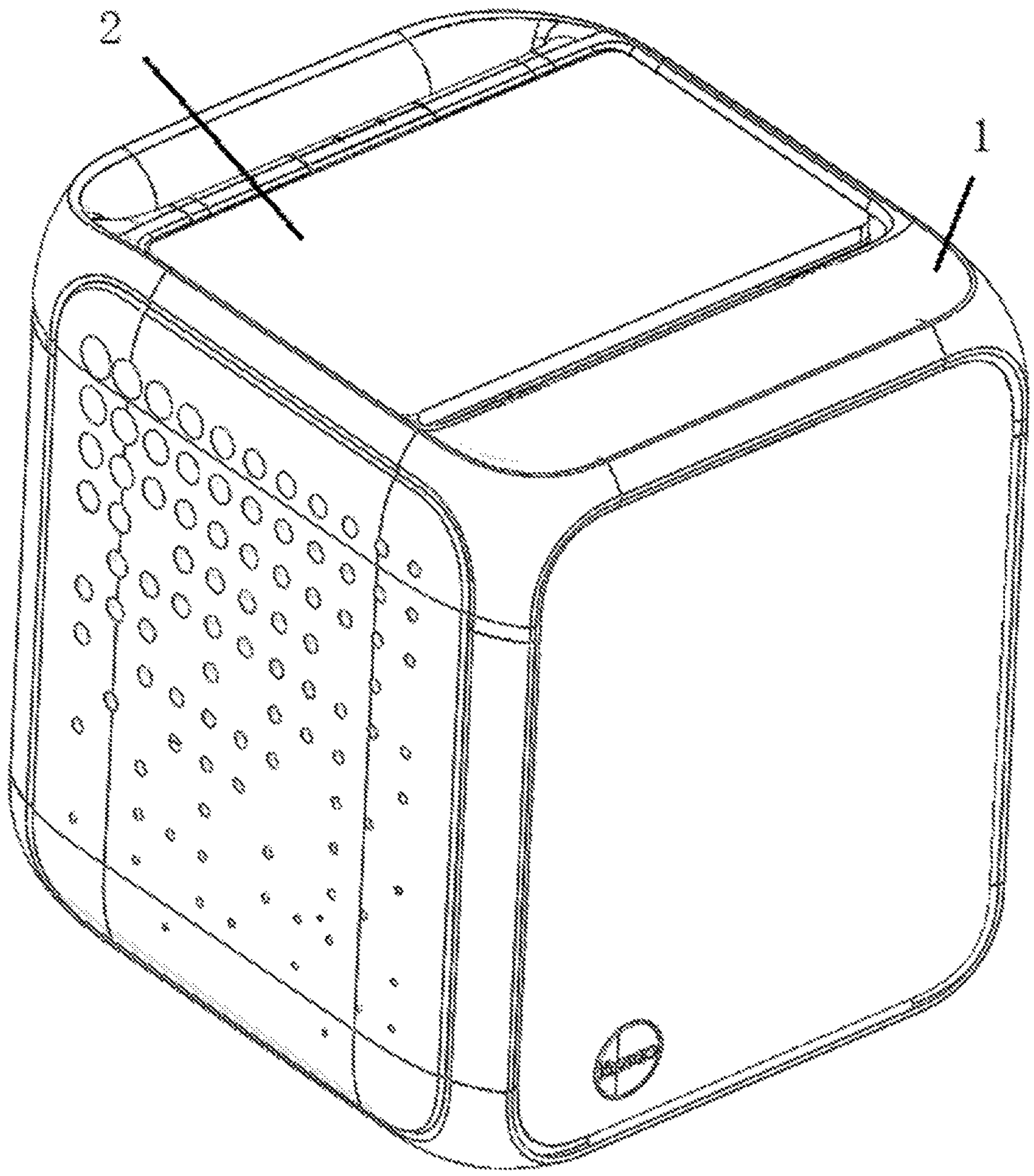
FIG. 1 is a schematic view showing the structure of a speaker assembly in an accommodating state according to an embodiment of the present application.

Reference numerals:

| | | | |
|---|---|---|---|
| 100 | speaker assembly, | 200 | microphone, |
| 200a | annular lock groove, | 1 | speaker body, |
| 101 | screen groove, | 2 | display screen, |
| 3 | microphone accommodating assembly, | | |
| 301 | accommodating cylinder, | | |
| 3011 | accommodating groove, | 3012 | upper sleeve, |
| 3012a | lift-limit boss, | 3012b | abutting slope, |
| 3013 | lower sleeve, | 302 | claw sleeve, |
| 3021 | claw hook portion, | 3022 | hook portion, |
| 303 | lifting spring, | 304 | snap-fit push-push latch; |
| 3041 | clamping claw, | 3042 | trigger button. |

DETAILED DESCRIPTION OF THE EMBODIMENTS

Technical solutions according to the embodiments of the present application will be described clearly and completely as follows in conjunction with the accompany drawings in the embodiments of the present application, so that purposes, characteristics and advantages of the present application can be more obvious and understandable. It is obvious that the described embodiments are only a part of the embodiments according to the present application, rather than all of the embodiments. All the other embodiments obtained by those skilled in the art based on the embodiments in the present application without any creative work belong to the scope of protection of the present application.

In the description of the present application, it should be appreciated that, when a component is said to be "connected" to another component, it may be directly connected to the other component or there may be an intermediate component present at the same time. When a component is said to be "arranged" at another component, it may be directly arranged at the other component or there may be an intermediate component present at the same time.

The orientation or positional relationships indicated by terms such as "long", "short", "inner", "outer", and the like are based on the orientation or positional relationships shown in the drawings, and are merely for the convenience of describing the present application, and do not indicate or imply that the device or element referred to must have a particular orientation, or be configured and operated in a particular orientation, which therefore should not be construed as a limitation to the scope of the present application.

The present application is described in detail hereinafter in conjunction with the embodiments illustrated in the drawings. The embodiments do not limit the present application, and any variations made to the structure, method and function by those skilled in the art according to the embodiments belong to the scope of protection of the present application.

A smart portable karaoke system is provided according to the present application, which is applicable to both indoor places such as a conference room or a karaoke box, and outdoor places, and can solve the problem in the prior art that the microphone is inconvenient to carry and accommodate, thereby inconvenient to use.

Figure 2:
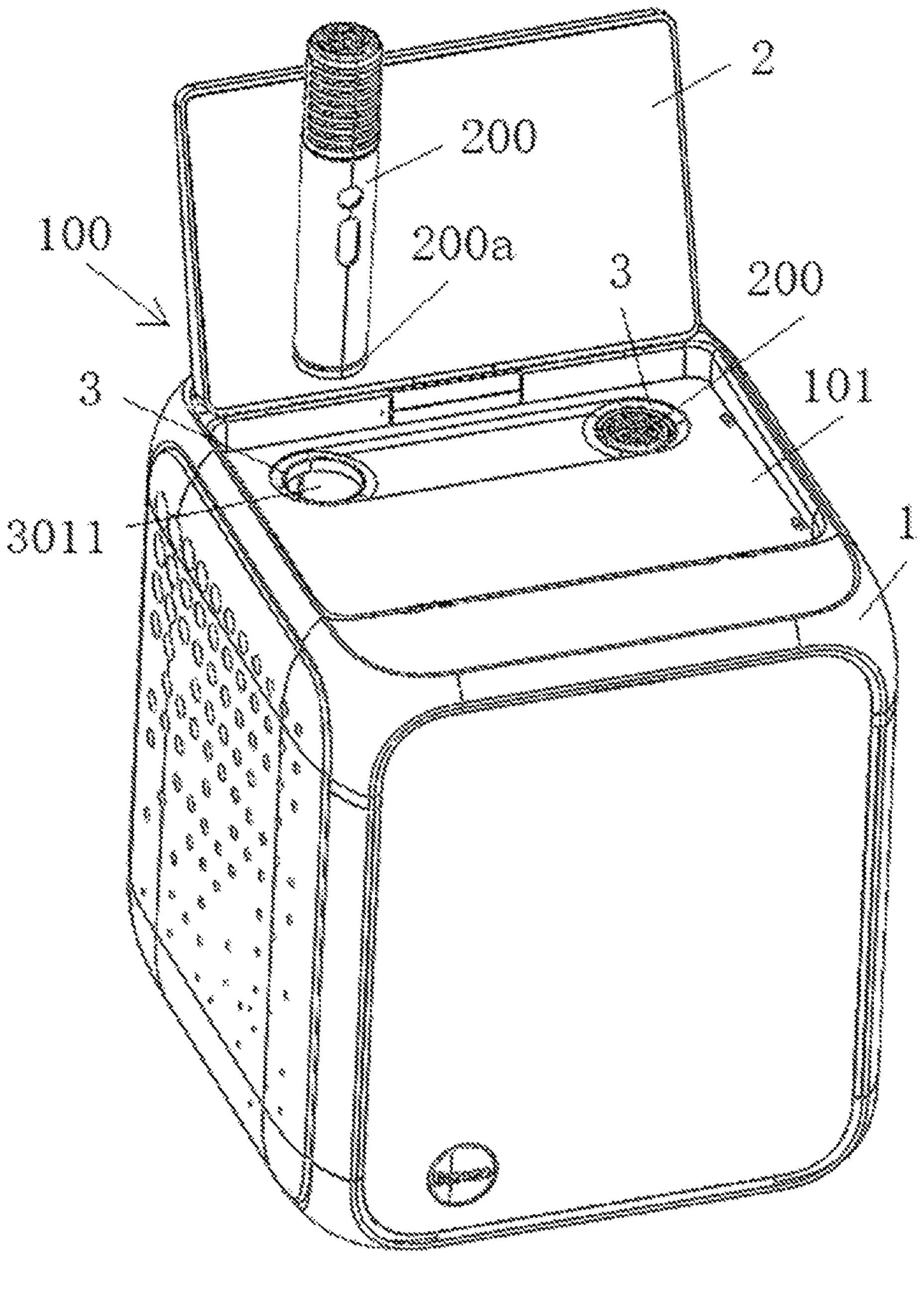
FIG. 2 is a schematic view showing the structure of the speaker assembly in a use state according to the embodiment of the present application.

Referring to FIGS. 1 and 2, the smart portable karaoke system includes a speaker assembly 100 and multiple microphones 200. Preferably, two microphones 200 are provided. Certainly, one microphone 200 can be provided, or three or more microphones 200 can be provided.

The speaker assembly 100 includes a speaker body 1, a display screen 2, and multiple microphone accommodating assemblies 3 in one-to-one correspondence to the multiple microphones 200.

A top face of the speaker body 1 is provided with a screen groove 101. Each microphone accommodating assembly 3 is located at a bottom of the screen groove 101, and extends downwards into an inner space of the speaker body 1. Further, the inner space may be provided with a speaker port tube, a speaker assembly, a battery or the like, which is not the focus of the present application, and is not described herein.

Figure 3:
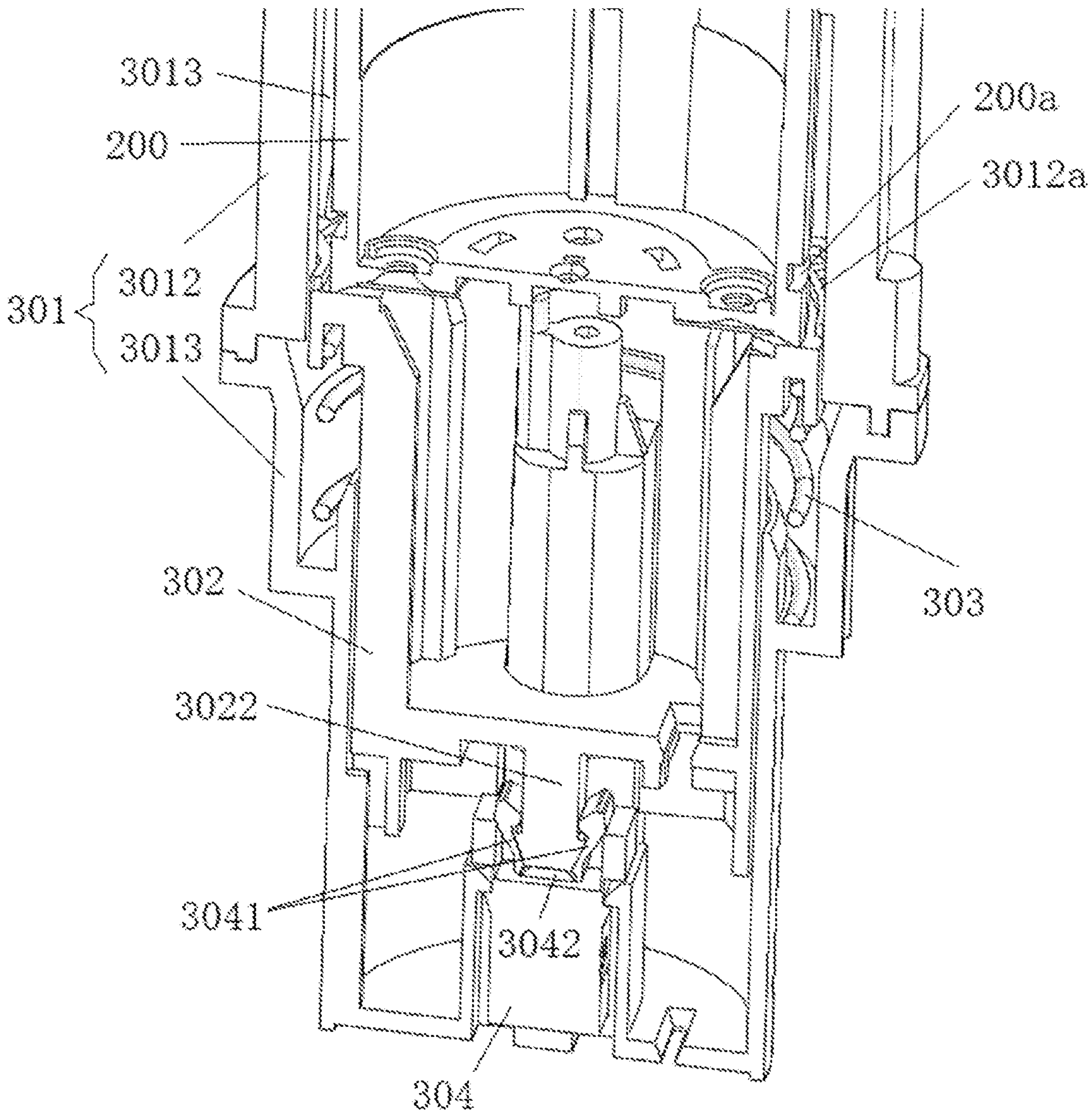
FIG. 3 is a sectional schematic view showing a microphone storage assembly along a first vertical section according to an embodiment of the present application (an abutting slope is not shown from this perspective)
Figure 4:
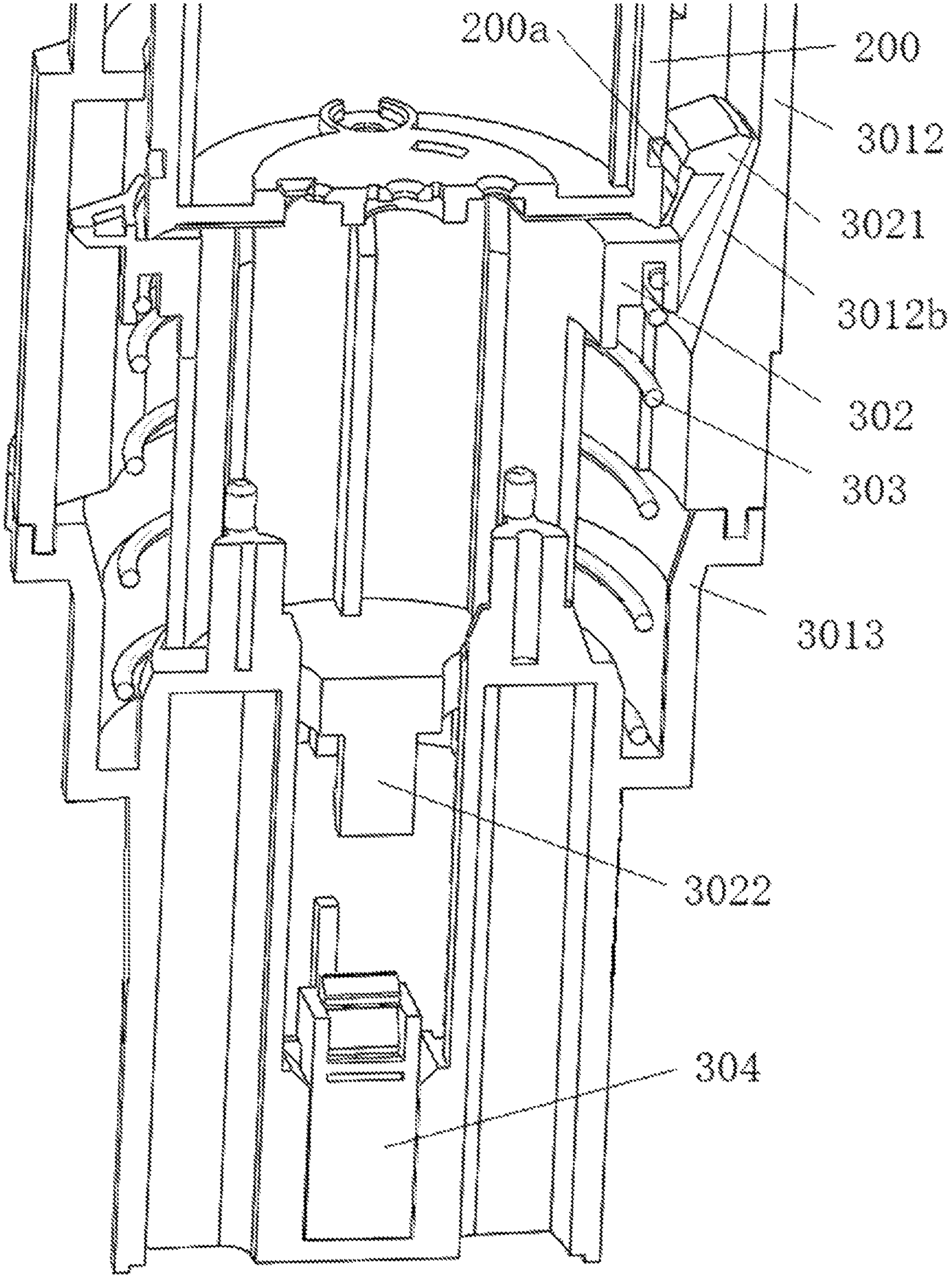
FIG. 4 is a sectional schematic view showing the microphone storage assembly along a second vertical section according to the embodiment of the present application (the first vertical section is perpendicular to the second vertical section)
Figure 5:
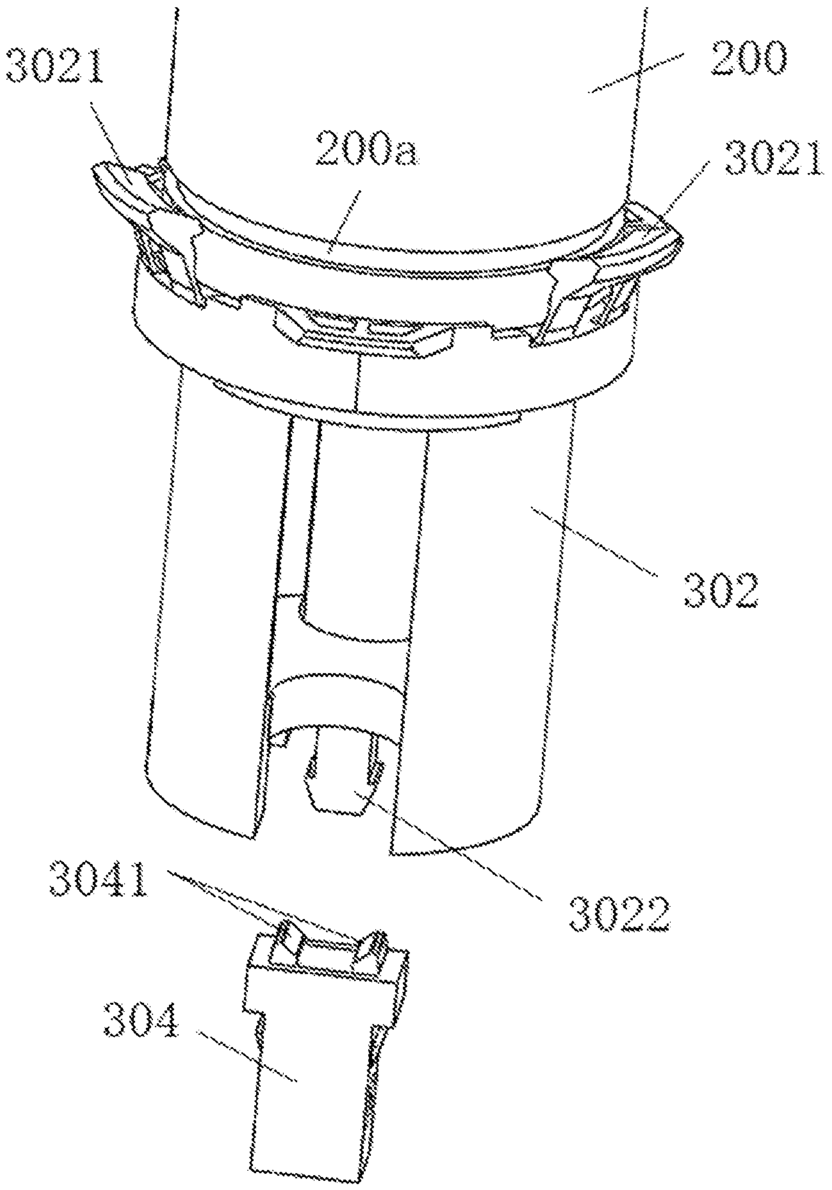
FIG. 5 is a schematic view showing the fit of a claw sleeve and a microphone according to an embodiment of the present application.

Referring to FIGS. 3 to 5, in this embodiment, the microphone accommodating assembly 3 includes an accommodating cylinder 301, a claw sleeve 302, a lifting spring 303 and a snap-fit push-push latch 304.

An upper end of the accommodating cylinder 301 is fixed on the speaker body 1, and an accommodating groove 3011 is provided in an interior of the accommodating cylinder 301, into which the microphone 200 is inserted. The accommodating groove 3011 is provided with an opening facing upwards and is exposed from the groove bottom of the screen groove 101, allowing a user to easily insert the microphone 200 into the accommodating groove 3011.

The claw sleeve 302 is mounted in the accommodating groove 3011 and is slidable in upward and downward directions. Further, the lifting spring 303 is located under the claw sleeve 302, and is configured to drive the claw sleeve 302 to slide upwards with respect to the accommodating groove 3011. Correspondingly, a groove wall of the accommodating groove 3011 is provided with a lift-limit boss *3012a*, which protrudes above the claw sleeve 302 to prevent the claw sleeve 302 from sliding further upwards.

The groove wall of the accommodating groove 3011 is further provided with an abutting slope *3012b*, and a claw hook portion 3021 is provided on the claw sleeve 302 at a place corresponding to the abutting slope 3012*b*. Further, a distance from the abutting slope 3012*b* to a central axis of the accommodating cylinder 301 decreases from top to bottom, such that:

when the user pushes the microphone 200 downwards, the claw sleeve 3021 slides downwards along the abutting slope 3012*b* under a downward driving force of the microphone 200. Since a lower portion of the abutting slope 3012*b* protrudes inwards, the claw sleeve 3021 contracts inwards in a radial direction when sliding downwards, and locks an annular lock groove 200*a* at a lower portion of the microphone 200, such that the microphone 200 is fixed with respect to the claw sleeve 302, which prevents the user from taking out the microphone 200; and reversely, when the lifting spring 303 drives the claw sleeve 302 to slide upwards with respect to the accommodating cylinder 301, since an upper portion of the abutting slope 3012*b* contracts outwards, the claw hook portion 3021 restores deformation when losing the abutting of the abutting slope 3012*b* when sliding upwards, i.e. the claw sleeve 3021 expands outwards in the radial direction, gets out of the annular lock groove 200*a* and releases the microphone 200, which allows the user to take out the microphone easily.

In this embodiment, a bottom portion of the claw sleeve 302 is provided with a hook portion 3022. The snap-fit push-push latch 304 is fixedly arranged at the groove bottom of the accommodating groove 3011 to lock the hook portion 3022. It should be noted that, the snap-fit push-push latch 304 includes two clamping claws 3041 in general. When being pushed for the first time, the two clamping claws 3041 get close to each other, thereby clamping the hook portion 3022. When being pushed again, the two clamping claws 3041 get away from each other, thereby releasing the hook portion 3022. Further, the specific structure and operation principle of the snap-fit push-push latch 304 belong to the prior art, which are not the focus of the present embodiment, and is not described herein.

Therefore, when the user pushes the microphone 200 downwards for the first time, the microphone 200 slides downwards with respect to the accommodating groove 3011, and drives the claw sleeve 302 to slide downwards with respect to the accommodating cylinder 301. When the claw hook portion 3021 of the claw sleeve 302 locks the microphone 200, the hook portion 3022 pushes the snap-fit push-push latch 304 for the first time, such that the snap-fit push-push latch 304 locks the hook portion 3022, thereby preventing the claw sleeve 302 from sliding further upwards. At this time, the microphone is in a sunken state, completely enters the accommodating groove 3011, and is locked inside the accommodating groove 3011. Even if the user releases the microphone 200 or overturns the speaker body 1, the microphone is unable to get out of the accommodating groove 3011.

When the user pushes the microphone 200 downwards again, the microphone 200 drives the hook portion 3022 to push the snap-fit push-push latch 304 downwards again, such that the snap-fit push-push latch 304 releases the hook portion 3022. Then the user releases the microphone 200, and the lifting spring 303 drives the claw sleeve 302 to drive the microphone 200 to slide upwards. When the claw sleeve 302 slides upwards until abutting against the lift-limit boss 3012*a*, both the claw sleeve 302 and the microphone 200 are unable to slide further upwards. At this time, the claw hook portion 3021 releases the microphone 200. The microphone 200 is in a lifted state, and an upper end of the microphone 200 protrudes upwards to an exterior of the accommodating groove 3011, allowing the user to take the microphone 200 out of the accommodating groove 3011.

In an embodiment, the accommodating cylinder 301 includes an upper sleeve 3012 provided with the lift-limit boss 3012*a*, and a lower sleeve 3013 in a fixed connection with the snap-fit push-push latch 304, and the upper sleeve 3012 and the lower sleeve 3013 are in a snap-fit connection. During assembling, the claw sleeve 302 is firstly inserted to a bottom portion of the upper sleeve 3012 from bottom to top, the snap-fit push-push latch 304 is then fixed in the lower sleeve 3013, and the upper sleeve 3012 and the lower sleeve 3013 snap together finally.

In an embodiment, the display screen 2 is in a hinged connection with the speaker body 1. The display screen 2 has two states, an accommodating state in which the display screen 2 is rotated with respect to the speaker body 1 to a position covering the opening of the accommodating groove 3011, and a use state in which the display screen 2 is rotated with respect to the speaker body 1 to a position away from the opening of the accommodating groove 3011.

A smart portable karaoke system provided according to the present embodiment includes operation processes as follows.

1. In an initial state:

the microphone is accommodated completely inside the accommodating groove 3011, the display screen 2 is rotated downwards to a horizontal position to the accommodating state, and the display screen 2 not only is accommodated in the screen groove 101, but also covers the microphone 200, such that the overall look is tidy and beautiful;

2. When the microphone 200 is required to be used:

S10: rotating the display screen 2 upwards to a vertical or inclined position to a use state, exposing the opening of the accommodating groove 3011;

S20: the user pushing the microphone 200 downwards once, and during this process:

S201: the microphone 200 driving the claw sleeve 302 downwards, and the hook portion 3022 at the bottom portion of the claw sleeve 302 pushing a trigger button 3042 of the snap-fit push-push latch 304 downwards;

S202: the two clamping claws 3041 of the snap-fit push-push latch 304 opening and releasing the hook portion 3022;

S30: the user releasing the microphone 200, and during this process:

S301: the lifting spring 303 drives the claw sleeve 302 to drive the microphone 200 to slide upwards together, and during sliding upwards, the claw hook portion 3021 expands outwards gradually and getting out of the annular lock groove 200*a* at the lower portion of the microphone 200;

S302: when the claw sleeve 302 slides upwards until abutting the bottom portion of the lift-limit boss 3012*a*, at this time the claw sleeve 302 is unable to slide further upwards, while the claw hook portion 3021 completely releases the microphone 200, and the upper end of the microphone 200 protrudes upwards to the exterior of the accommodating groove 3011, so as to allow the user to take the microphone 200 out of the accommodating groove 3011;

S40: the user takes the microphone 200 out of the accommodating groove 3011, selects a song via the display screen 2, and sings accompanied by the speaker body 1; and 3. When the microphone 200 is accommodated:

S50: the user inserting the microphone 200 into the accommodating groove 3011, and pushing the microphone 200 downwards against the resilient force of the lifting spring 303, and during this process:

S501: the microphone 200 drives the claw sleeve 302 downwards gradually, the claw hook portion 3021 contracts inwards gradually, and the hook portion 3022 gets close to the snap-fit push-push latch 304 gradually;

S502: the claw hook portion 3022 touches and pushes the trigger button 3042 of the snap-fit push-push latch 304 downwards, the clamping claws 3041 of the snap-fit push-push latch 304 clamps the hook portion 3022, and at this time, the claw hook portion 3021 contracts inwards to lock the annular lock groove 200*a* at the bottom portion of the microphone 200; at this time, the microphone is completely enters the accommodating groove 3011 and is not higher than the groove bottom of the screen groove 101 to affect closing the screen;

S60: rotating the display screen 2 downwards, such that the display screen 2 restores to the accommodating state in the initial state.

Sometimes, the user may listen to the music via the speaker body 1 with the microphone inserted inside the accommodating groove 3011. At this time, violent vibrations occur in the speaker body 1. In an embodiment, an inner wall of the accommodating groove 3011 is attached with vibration damping foam. Further, an outer wall of the lifting spring 303 is covered by the vibration damping foam to reduce the effect of the vibrations to the microphone 200.

The speaker assembly 100, the microphone 200 and the smart portable karaoke system provided in the present embodiment have the following advantages.

1. The microphone can be accommodated in the speaker body 1, which solves the problem in the prior art that, the microphone 200 is inconvenient to carry and accommodate due to separate arrangement;
2. The speaker body 1, the microphone 200, and the display screen 2 can be combined into a whole, which further improves the portability for carrying; and
3. The display screen 2 can cover the opening of the accommodating groove 3011, which prevents foreign matters such as dust from getting into the accommodating groove 3011.

It should be appreciated that, although the embodiments are described in the present specification, it does not mean that each embodiment only includes one independent technical solution. The description manner of the specification is merely for clearance, and those skilled in the art are supposed to take the specification as a whole. Further embodiments of the present application understood by those skilled in the art can be made by combining the technical solutions of various embodiments.

The descriptions in detail hereinbefore are merely specific descriptions for feasible implementations of the present application, and are not intended to limit the scope of the present application. Any modifications and equivalent implementations made to the above embodiments without departing from the spirit of the present application are deemed to fall into the scope of the present application.

The invention claimed is:

1. A speaker assembly, comprising:

an accommodating groove for accommodating a microphone;

an accommodating cylinder; and a claw sleeve;

wherein when the microphone is in the accommodating groove, the microphone has two states:

a sunken state, wherein the microphone is configured to slide downwards with respect to the accommodating groove and is locked in the accommodating groove when being pushed for a first time; and a lifted state, wherein the microphone is released and is configured to slide upwards with respect to the accommodating groove when being pushed again, wherein the accommodating cylinder is provided with the accommodating groove, and a groove wall of the accommodating groove is provided with an abutting slope, the claw sleeve is mounted in the accommodating groove and is slidable in upward and downward directions, and the claw sleeve is provided with a claw hook portion at a place corresponding to the abutting slope, when the claw sleeve suffers a downward driving force, the claw hook portion is configured to slide downwards along the abutting slope, and the claw hook portion is configured to contract inwards in a radial direction to lock the microphone, and when the claw sleeve suffers an upward driving force, the claw hook portion is configured to slide upwards along the abutting slope, and the claw hook portion is configured to expand outwards in the radial direction to release the microphone.

2. The speaker assembly according to claim 1, wherein a lifting spring is arranged under the claw sleeve, and is configured to drive the claw sleeve to slide upwards with respect to the accommodating groove.

3. The speaker assembly according to claim 2, wherein a lift-limit boss is provided on the groove wall of the accommodating groove, and the lift-limit boss protrudes above the claw sleeve to prevent the claw sleeve from sliding further upwards.

4. The speaker assembly according to claim 3, wherein a bottom portion of the claw sleeve is provided with a hook portion, and a groove bottom of the accommodating groove is fixedly provided with a snap-fit push-push latch for locking the hook portion.

5. The speaker assembly according to claim 4, wherein the accommodating cylinder comprises an upper sleeve provided with the lift-limit boss and a lower sleeve in a fixed connection with the snap-fit push-push latch, and the upper sleeve and the lower sleeve are in a snap-fit connection.

6. The speaker assembly according to claim 1, further comprising:

a speaker body; and a display screen, wherein the speaker body is provided with an inner space, the accommodating cylinder is located in the inner space, and an opening of the accommodating groove is exposed, the display screen is in a hinged connection with the speaker body, and the display screen has two states, and an accommodating state in which the display screen is rotated with respect to the speaker body to a position covering the opening of the accommodating groove, and a use state in which the display screen is rotated with respect to the speaker body to a position away from the opening of the accommodating groove.

7. The speaker assembly according to claim 6, wherein a top face of the speaker body is provided with a screen groove, the opening of the accommodating groove is located at a groove bottom of the screen groove, and when the display screen is in the accommodating state, the display screen is in the screen groove.

8. A microphone, wherein the microphone is inserted into the accommodating groove of the speaker assembly according to claim 1.

9. A smart portable karaoke system, comprising the speaker assembly and the microphone according to claim 1.

* * * * *